United States Patent [19]

Bagley

[11] Patent Number: 5,734,761
[45] Date of Patent: Mar. 31, 1998

[54] EDITING SCANNED DOCUMENT IMAGES USING SIMPLE INTERPRETATIONS

[75] Inventor: Steven C. Bagley, Menlo Park, Calif.

[73] Assignee: Xerox Corporation, Stamford, Conn.

[21] Appl. No.: 268,355

[22] Filed: Jun. 30, 1994

[51] Int. Cl.[6] .................................................. G06K 9/03
[52] U.S. Cl. ...................... 382/309; 382/311; 395/793
[58] Field of Search ................................ 382/309, 310, 382/311, 177, 178, 290; 395/144, 145, 146, 792, 793, 802, 803, 133; 364/419.17

[56] References Cited

U.S. PATENT DOCUMENTS

| | | | |
|---|---|---|---|
| 4,408,342 | 10/1983 | Grabowski et al. | 382/140 |
| 4,516,262 | 5/1985 | Sakurai | 382/185 |
| 4,610,025 | 9/1986 | Blum et al. | 382/177 |
| 4,739,477 | 4/1988 | Barker et al. | 395/600 |
| 4,860,376 | 8/1989 | Tanka et al. | 382/231 |
| 4,881,130 | 11/1989 | Hayashi | 358/443 |
| 4,897,804 | 1/1990 | Kawakami et al. | 395/145 |
| 4,914,709 | 4/1990 | Rudak | 382/311 |
| 4,974,194 | 11/1990 | Barker et al. | 364/419.14 |
| 4,974,260 | 11/1990 | Rudak | 382/311 |
| 5,003,614 | 3/1991 | Tanaka et al. | 382/171 |
| 5,010,581 | 4/1991 | Kanno | 382/305 |
| 5,021,973 | 6/1991 | Hernandez et al. | 395/161 |
| 5,022,081 | 6/1991 | Hirose et al. | 381/43 |
| 5,142,620 | 8/1992 | Watanabe et al. | 395/164 |
| 5,167,016 | 11/1992 | Bagley | 395/144 |
| 5,224,038 | 6/1993 | Bespalko | 364/419.1 |
| 5,437,008 | 7/1995 | Gay et al. | 395/763 |

FOREIGN PATENT DOCUMENTS

| | | | |
|---|---|---|---|
| 312235A2 | 4/1989 | European Pat. Off. | G06F 15/72 |
| 325417A2 | 7/1989 | European Pat. Off. | G06F 15/62 |
| 434930A2 | 7/1991 | European Pat. Off. | G06F 15/72 |
| 167342B1 | 8/1992 | European Pat. Off. | G06F 15/72 |
| 576178A3 | 12/1993 | European Pat. Off. | G06F 15/72 |
| 585073A2 | 3/1994 | European Pat. Off. | H04N 1/387 |
| 652538A | 5/1995 | European Pat. Off. | G06T 11/60 |
| 2162350 | 1/1986 | United Kingdom | G06F 7/00 |

OTHER PUBLICATIONS

Robert Cowart, "Mastering Windows 3.1 Special Edition", Chapter 11, pp. 355–392, 1993.

European Search Report and Annex for Application No. EP 95 30 4121, published Sep. 26, 1996.

Levy, D., "On the Design of Tailorable, Figural Editors," SSL Report P89-00018, Xerox Parc, Jan. 1987.

(List continued on next page.)

Primary Examiner—Leo Boudreau
Assistant Examiner—Phuoc Tran
Attorney, Agent, or Firm—Richard B. Domingo

[57] ABSTRACT

A method and apparatus for editing a scanned image. The present invention provides for editing of a scanned image in terms of interpretations of graphical objects contained therein. A graphical object can represent a letter, word, line of text, graphic or any other portion of the document image selected by the user. An interpretation embodies a predetermined relationship between graphical objects as well as editing operations that can be performed on the graphical objects. Interpretations belong to one of two classes. A first class, set interpretation, treats graphical objects as an unordered set lying within a document plane. Editing operations in a set interpretation allow a graphical object to be manipulated within in the document plane without disturbing the spatial orientation of other graphical objects. A second class, sequence interpretation, is like a set interpretation except that the set of graphical objects are ordered. An editing operation in a sequence interpretation will typically affect the spatial orientation of other graphical objects in the set of graphical objects. A particular type of sequence interpretation, called text interpretation, allows for manipulation of sets of graphical objects as if they were text.

23 Claims, 7 Drawing Sheets

OTHER PUBLICATIONS

Suenaga, Y., "Some Techniques for Document and Image Preparation," *Systems and Computers in Japan*, vol. 17, No. 3, 1986, pp 35–46.

Stallman, R., GNU Emacs Manual, Sixth Edition, Version 18, Free Software Foundation, Cambridge, Mass., Mar. 1987, pp. 1–30.

European Search Report and Annex for Application No. EP 90 12 0915, published Jan. 7, 1993.

Ballard, D.H. and Brown, C.M., *Computer Vision*, Prentice Hall, 1982, pp. 149–150.

Kanai, J., Krishnamoorthy, M.S., and Spencer, T., "Algorithms for Manipulating Nested Block Represented Images," Advance Printing of Paper Summaries, SPSE's 26th Fall Symposium, Arlington, Virginia, Oct. 1986, pp. 190–193.

Srihari, S.N., "Document Image Analysis: An Overview of Algorithms," Advanced Printing of Symposium Summaries, SPSE's 40th Annual Conference and Symposium on Hybrid Imaging Systems, Rochester, NY, May 1987, pp. 28–31.

Pavlidis, T., Algorithms for Graphics and Image Processing, Computer Science Press, Rockville, MD, 1982, p. 134.

Kim, S.E., *Viewpoint: Toward a Computer for Visual Thinkers*, University Microfilms, Ann Arbor, 1988, pp. 22–97, 115, and 123–131.

Suenaga, Y., and Nagura, M., "A Facsimile Based Manuscript Layout and Editing System by Auxiliary Mark Recognition," *5th International Conference on Pattern Recognition Proceedings*, Dec. 1–4, 1980, vol. 2, pp. 856–858.

Suenaga, Y., "A Facsimile Based Text Editor Using Handwritten Mark Recognition," *Proceedings of the Sixth International Joint Conference on Artificial Intelligence, Tokyo, Aug. 20–23, 1979*, vol. 2, 1979, pp. 856–858.

Wong, K.Y., Casey, R.G., and Wahl, F.M., "Document Analysis System," *IBM Journal of Research and Development*, vol. 26, No. 6, Nov. 1982, pp. 647–656.

Casey, R.G., and Wong, K.Y., "Text Recognition Using Adaptive Software," *Globecom '85*, vol. 1, IEEE, 1985, pp. 353–357.

Nagy, G., and Seth, S., "Hierarchical Representation of Optically Scanned Documents," *Proceedings of IEEE 7th International Conference on Pattern Recognition*, 1984, pp. 347–349.

Nagy, G., Kanai, J., Krishnamoorthy, M., Thomas, M., and Viswanathan, M., "Two Complementary Techniques for Digitized Document Analysis," *ACM Conference on Document Processing Systems*, Santa Fe, N.M., Dec. 5–9, 1988, pp. 169–176.

Kleper, M.L., *The Illustrated Handbook of Desktop Publishing and Typesetting*, TAB Books 1987, pp. 298–305.

Pratt, W.K., Capitant, P.J., Chen, W.H., Hamilton, E.R., and Wallis, R.H., "Combined Symbol Matching Facsimile Data Compression System," *Proceedings of the IEEE*, vol. 68, No. 7, Jul. 1980, pp. 786–796.

1001
1002 Boktryckarkonsten är källan till praktiskt taget all mänsklig odling.
—Printing is the source of practically all human evolution.
1004 Den förutan hade de oerhörda framstegen inom vetenskap
—Without it the tremendous progress in the fields of science and   1003
1006 och teknik inte varit möjliga.
—technology would not have been possible.
−VALTER FALK   1005
1007

EDITING SCANNED DOCUMENT IMAGES USING SIMPLE INTERPRETATIONS

FIELD OF THE INVENTION

The present invention relates to the field of the editing and manipulation of graphical objects, including text, contained in scanned image data.

BACKGROUND OF THE INVENTION

Scanned image data of a medium is typically a collection of binary values which correspond to the markings on the medium. A common approach to editing text data contained within scanned image data is format conversion. In format conversion, areas of text in the image data is identified and then converted into a symbolic representations (e.g. ASCII codes). Format conversion in many instances is undesirable because it can cause undue processing relative to the task at hand. For example, if editing a scanned image that is to be faxed or printed, the faxing or printing does not require the data to be in the symbolic representation. Further, the conversions performed may not be accurate so proofreading is required. Thus, it is often desirable to edit text in its scanned image form.

A technique for editing textual data contained in scanned image data is described in U.S. Pat. No. 5,167,016, entitled "Changing Characters in An image" to Bagley et al. which is assigned to the assignee of the present invention (hereinafter the '016 patent). As shown and described in relation to FIGS. 9–11 of the '016 patent, an incorrect word in an image is corrected by replacing it with a newly typeset word to obtain a modified version of the image. The newly typeset word is produced from characters in the images. As shown and described in relation to FIG. 11 of the '016 patent, interword spaces are adjusted to accommodate the new word.

Bagley et al., EP- A 434 930 describes techniques for editing text in an image by operating on character size arrays. As shown and described in relation to FIG. 18 of EP- A 434 930, a line can be justified by spreading excess interword spacing equally among the interword spaces. Interword spaces can be found based on the assumption that any space between arrays that is greater than or equal to a threshold D is an interword space. But if the excess interword space within a line is too great, an error message is provided because the line cannot be justified. As noted, the technique in FIG. 18 could be elaborated to allow for movement of words between lines: If a line includes too much space to be justified, a word from a following line could be added if in the same paragraph and if not so long it will make the line too long to justify. Or if a line is too long, words could be moved to the next line until it can be justified. If a line is the last in a paragraph, it is not justified but its interword spaces are set at a default values such as D.

The prior art typically has document representation as a collection of image elements extracted through simple geometrical analysis. This analysis stems from three observations, one about text editing and two about typographics. First, not all text editing operations depend on the character labels of the characters being edited (for example, a search operation does, but copying and deleting operations do not). Second, characters are visually distinct graphical objects. Third, lines are alignments of characters and are themselves visually separable.

Such prior art systems have restrictions and limitations. First, the document structure of lines and characters cannot be modified by the user once it has been computed. The heuristics for segmenting lines and joining connected components can lead to undesired results. For example, a small amount of page skew can cause neighboring lines to become inappropriately merged. Second, the assumptions for editing text are formed according to a rather restrictive typographic mode of text. Common assumptions are that the page is a single column of text, that the lines are horizontal and do not overlap, that there are no vertical rulings, and that there are no multi-line figures embedded in the text column. Third, the pre-editing analysis is applied to the entire page, even if the page is not entirely text. Although no information is lost by doing so, it is wasteful to apply the heuristic analysis to a line drawing or a half-tone. So for example, the techniques for editing text in image data as disclosed in the prior art are not suitable for use with documents that contain a variety of graphical and textual designs, including rotated text, text in a specified order, and simple arrangements of graphical elements.

Other work related to the present invention includes:

"Viewpoint: Towards A Computer for Visual Thinkers", Scott Kim, Ph.D. dissertation, Computers and Graphic Design, Stanford University, 1987. This works describes a bitmap editor for text and graphics called Viewpoint. The Viewpoint system is used to create and edit Viewpoint documents. So for example, it cannot be used to accurately edit scanned documents (i.e. documents not created by Viewpoint).

"A Facsimile Based Manuscript Layout and Editing System By Auxiliary Mark Recognition", Y. Suenaga and N. Nagura, Proceedings of the IEEE 5th International Conference on Pattern Recognition, 1980. What is described is a non-interactive editing system that uses handwritten marks, similar to proofreader's marks, to perform cut-and-paste arrangement of blocks of texts and graphics on a scanned page.

"On the Design of Tailorable, Figural Editors", David M. Levy, SSL-89-14, Xerox Palo Alto Research Center, 1987. At pages 4–11 a System Zero is described which combines capabilities of a structured drawing editor with that of a bit-mapped image editor for the creation and manipulation of figures. In System Zero, figures are represented by rectangular bit-maps. A user may create an aligned and ordered group of figures which may be edited in a text-like fashion. Like the Viewpoint system described above, System Zero is not designed for the editing of documents not created by the System Zero system.

SUMMARY OF THE INVENTION

A method and apparatus for editing a scanned image is disclosed. The present invention provides for editing of the scanned image in terms of interpretations of graphical objects defined therein. An interpretation embodies a predetermined relationship between graphical objects as well as various editing operations that can be performed. A graphical object can represent a letter, word, line of text, image or any other portion of the document image defined by the user. A graphical object may also be the result of an operation performed on another graphical object (or set of graphical objects). As an example, an interpretation may be created for treating graphical objects as text. Insertion and deletion editing functions would behave in a "text-like" fashion by maintaining character spacings. Another interpretation may treat graphical objects as non-text so as to not require the maintaining of character spacing for insert or delete operations.

Interpretations generally fall into one of two classes. A first class, set interpretation, is an unordered collection of graphical objects lying within a document plane. An operation that can be performed within a set interpretation is to move the graphical objects to another location within the document plane. A second class, sequence interpretation, is like a set interpretation except that the collection of graphical objects are ordered. An operation that can be performed within a sequence operation is to insert or delete a graphical object while maintaining the order and spatial alignment of the graphical objects. Further associated with sequence interpretations is the notion of a baseline for the set of graphical objects. The baseline provides for alignment of graphical objects with respect to a common reference. In the present invention, a baseline may be linear, rotated or curved. One type of sequence interpretation is termed a text interpretation. The text interpretation is used for the editing of graphical objects in a text-like fashion.

An instance of interpretation is comprised of a set of graphical objects and the editing operations that can be performed on the graphical objects. The editing operations associated with a particular interpretation will edit the set of graphical objects according to a predetermined relationship. For example, in an instance of a text interpretation,the graphical objects associated therewith may be treated as if they were individual letters. In this case insertion and deletion operations would maintain character spacings. An instance of an interpretation may be created by the issuance of a predetermined command and selection of the desired graphical objects.

The present invention increases the type and number of documents which may be edited by allowing a user to define how graphical objects within a scanned document are treated as they are edited. For example, interpretations can be generated for the editing of rotated or non-linear text. The present invention may be implemented on various platforms such as a digital copier, facsimile machine, document processing system or as a standalone software package for execution on a suitable computer system.

DETAILED DESCRIPTION OF THE CURRENTLY PREFERRED EMBODIMENT

A method and apparatus for editing a scanned document image is disclosed. In the following description numerous specific details are set forth, such as calculations for character spacings for performing deletion and insertion operations, in order to provide a thorough understanding of the present invention. It would be apparent, however, to one skilled in the art to practice the invention without such specific details. In other instances, specific implementation details such as parsing techniques for extracting characters from a scanned document image, have not been shown in detail in order not to unnecessarily obscure the present invention.

It should be noted that a scanned document image is simply a bit-mapped representation of an image obtained through a scanning process. The present invention could be used with any document having a bit-mapped representation. For example, frame grabbers are used to capture bit-mapped representations of images from a video source. Such bit-mapped representations can be edited on system embodying the present invention. Further, the terms scanned document image, bit-mapped representation of an image and bit-mapped image are used interchangeably herein and are taken to have the same meaning.

As will become apparent in the description below, the present invention finds particular advantage in editing text contained in a scanned image. Documents which are faxed or which are copied on a digital copier typically cause creation of scanned images which contain primarily text. As described with respect to the prior art, it is common that in order to edit any of the text contained in the scanned image, extraneous processing such as Optical Character Recognition (OCR) must be performed. As will become apparent, the present invention minimizes extraneous processing and provides added flexibility to defining the orientation of text so as to allow the editing of a wider range of textual data in a scanned image.

Figure 1:
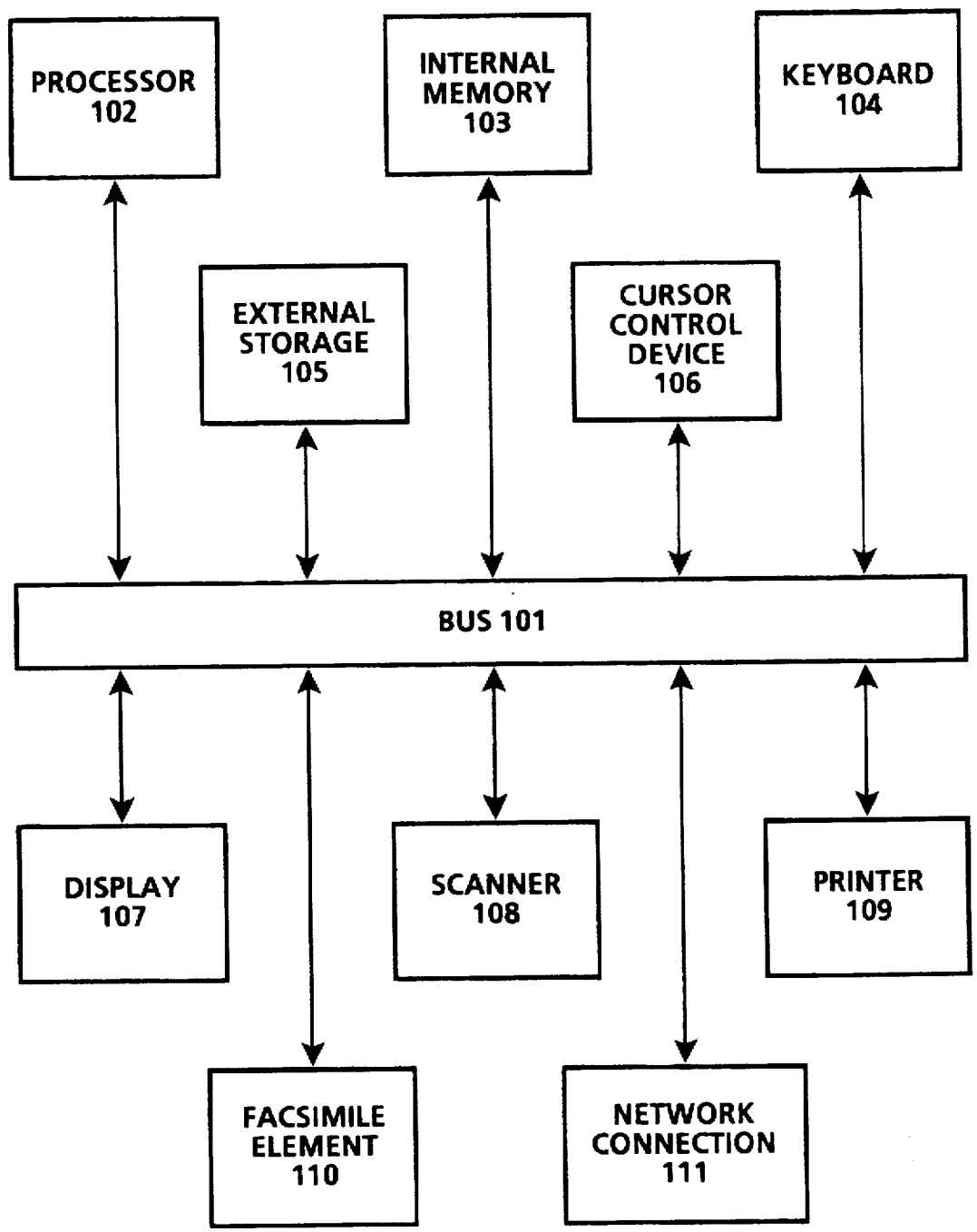
FIG. 1 is a block diagram illustrating the functional elements of a computer based system upon which the currently preferred embodiment of the present invention may be implemented.

Overview of a Computer Based System In the Currently Preferred Embodiment of the Present Invention The computer based system on which the currently preferred embodiment of the present invention may be implemented is described with reference to FIG. 1. Referring to FIG. 1, the computer based system is comprised of a plurality of components coupled via a bus 101. The bus 101 illustrated here is simplified in order not to obscure the present invention. The bus 101 may consist of a plurality of parallel buses (e.g. address, data and status buses) as well as a hierarchy of buses (e.g. a processor bus, a local bus and an I/O bus). In any event, the computer system is further comprised of a processor 102 for executing instructions provided via bus 101 from Internal memory 103 (note that the Internal memory 103 is typically a combination of Random Access or Read Only Memories). The processor 102 and Internal memory ROM 103 may be discrete components or a single integrated device such as an Application Specification Integrated Circuit (ASIC) chip.

Also coupled to the bus 101 are a keyboard 104 for entering alphanumeric input, external storage 105 for storing data, a cursor control device 106 for manipulating a cursor, and a display 107 for displaying visual output. The keyboard 104 would typically be a standard QWERTY keyboard but may also be telephone like keypad. The external storage 105 may be fixed or removable magnetic or optical disk drive. The cursor control device 106 will typically have a button or switch associated with it to which the performance of certain functions can be programmed. Further coupled to the bus 101 is a scanner 108. The scanner 108 provides a means for creating a bit-mapped representation of a medium (i.e. a scanned document image).

Optional elements that could be coupled to the bus 101 would include printer 109, facsimile element 110 and network connection 111. The printer 109 could be used to print the bit-mapped representation after it has been edited. The facsimile element 110 could be used for facsimile transmittal of the bit-mapped representation after it has been edited. Note that the facsimile element 110 could utilize the functionality of the scanner 108 and printer 109 to create the full functionality of a facsimile device. The network connection 111 would be used to receive and/or transmit data containing a bit-mapped representation of a medium.

The currently preferred embodiment of the present invention is implemented for use on a Sun Microsystems Workstation, available from Sun Microsystems of Mountain View, Calif. However, the present invention may be embodied in various systems different from the preferred embodiment. For example, the present invention could be implemented on a digital copier, facsimile device, or any other system which manipulates scanned image data. The present invention may also be used in conjunction with or as part of other image editing systems such as "paint programs".

Further, while the currently preferred embodiment is described with respect to editing text, it should be noted that the described relationships between graphical objects is left to the interpretation. In other words, the present invention is not context sensitive so that any set of graphical objects will be edited according to the rules defined by the particular interpretation. This flexibility would allow creation of interpretations for editing various writing systems or even interpretations for particular document layouts.

User Interface

The combination of keyboard 104, cursor control device 106, display 107 and appropriate software instructions executing on processor 102 comprise a user interface. The majority of the display 107 is devoted to viewing a rectangular region of the graphical plane; all raster objects that intersect this region will be shown on display 107 at least in part. The offset and scale factors are user controlled. The user interface of the present invention provides for the performing of editing functions such as selection of interpretations, selection of editing operations within an interpretation and selection of graphical objects which are to be operated on. The selection of interpretations and editing operations may be performed via menu selection. Alternatively, this could be done via commands entered onto a command line.

The scanned document image will typically be displayed on the display 107. Editing of the document will occur in a What You See Is What You Get (WYSIWYG) fashion. After the desired interpretation selection is made, selection of graphical objects is typically performed by encapsulating the desired graphical object with a selection rectangle. A selection rectangle is created by positioning a pointer on one corner of the graphical object to be encapsulated, depressing a switch or button associated with the cursor control device, moving the pointer using the cursor control device to the opposite corner creating a rectangle in dashed lines, that is sufficient in size to cover the entire graphical object and releasing the switch associated with the cursor control device. Editing operations associated with the selected interpretation are then made available.

Graphical Interpretations

The present invention is premised on the notion of interpretations. An interpretation is a way of viewing and acting upon a collection of graphical objects defined by or interpreted from a scanned document image. Typically, an interpretation causes the collection of graphical objects to behave according to a desired characteristic (e.g. as if it were text). A graphical object can be part of more than one interpretation at any given moment; however, it is usually unnecessary to have more than one interpretation simultaneously active. Interpretations are organized into classes. Each class of interpretations has a name, for identification purposes, and a set of operations that make sense for that class. The set of operations includes an operation for constructing an instance of the interpretation for a set of graphical objects.

An interpretation class is similar to an abstract data type. A simple example of an interpretation class is text-interpretation, an instance of which contains a sequence of character objects, plus a description of the baseline of those objects as determined at the time the instance was created. The text-interpretation would support "text-like" operations, most notably, insertion and deletion of characters. The text-interpretation is described in greater detail below.

A graphical object is typically some selected portion of the scanned document image. However, an instance of an interpretation is itself a graphical object, occupying the bounding box of its constituents, and can be the object of editing commands or included in other interpretations. Some operations change properties of the interpretation, others affect each contained graphical object. This "nesting" of interpretations facilitates the creation of powerful editing functions through recursion.

In the currently preferred embodiment, the graphical objects being interpreted are binary raster arrays. Rasters are created by being read from some external image file, or by carving them out of other rasters, or by combining together several existing rasters. For imaging the rasters, their relative depth is unimportant because only black pixels are drawn on the screen; white is transparent.

In the currently preferred embodiment, instances of interpretations may be created automatically or via user-initiated procedures. As described above, an instance of an interpretation is a set of graphical objects, and a set of operations that can be performed on the set of graphical objects. The basic data structure classes for interpretations are arranged in an incremental and hierarchical fashion; each inherits from its immediate predecessor. There are two basic classes of interpretations; set interpretation and sequence interpretation. The class set interpretation maintains an unordered list of graphical objects and allows graphical objects to be added and removed from that list, mimicking operations for a set. The set interpretation models the appearance of possibly related but unordered graphical objects lying in a graphical plane. The class sequence interpretation maintains the graphical objects in the given order. Insertion and deletion take place at a cursor position so that the location of the modifications can be directly controlled. These interpretation classes are now described in greater detail.

Set Interpretations

Figure 2:
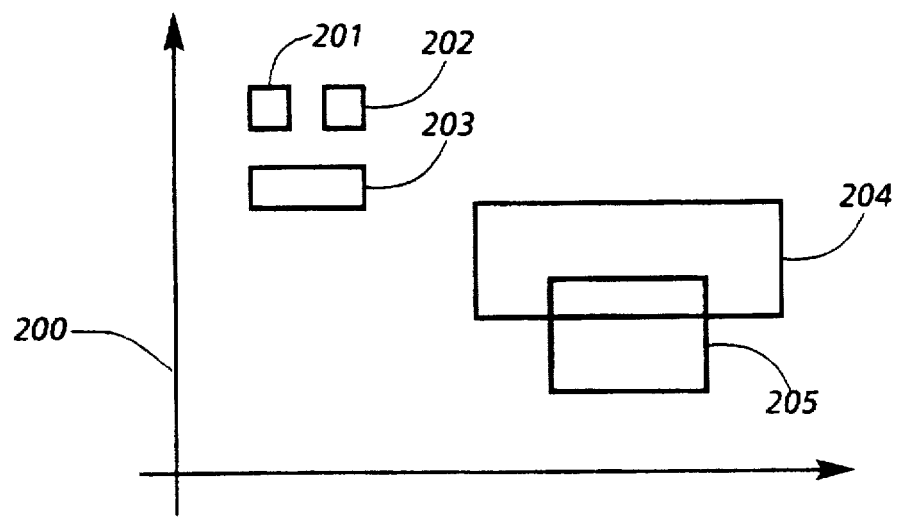
FIG. 2 illustrates the concept of a set interpretation as utilized in the present invention.

The set interpretation is intended to model the appearance of graphical objects in the plane, and provide natural operations for manipulating their positions or other attributes. This can be likened to editing of a fixed raster image containing the graphical objects. The set interpretation is illustrated in FIG. 2. Referring to FIG. 2 a document coordinate system 200 provides a means by which the spatial locations of the various graphical objects are measured. Each graphical object has a position measured from the plane's origin. Objects may overlap. Each of the graphical objects 201–205 maintain these spatial relationships and is itself represented as a binary raster containing the corresponding portion of the document image. As illustrated by 204 and 205, graphical objects may overlap. The operations focus on the organization of the objects, and on changes to the organization, rather than the alteration of the objects themselves, which are considered for the purposes here to be primitives.

Set interpretations provide a readily available means for manipulating the layout of graphical objects comprising a document image. Often when editing a bit-mapped image representation, it is desirable to not affect other graphical objects.

Common Operations For Set Interpretations

The set interpretation supports a number of operations. A few examples are as follows:

SELECT: Provides for selecting the set of graphical objects subject to a subsequent operation.

MOVE: Provides for moving a graphical object to any position in the plane.

DELETE: Provides for causing a graphical object to disappear from the plane and be removed from the system.

COPY: Provides for copying a graphical object by creating a new raster with identical appearance at a destination location.

CHARACTER PARSE: Provides for replacing a raster with the connected components (e.g. characters) within it.

TRIM: Provides for trimming a raster so that it has no all-white borders.

EXTRACT: Provides for specifying a rectangular subregion in a raster, moving it into a new raster.

LINEAR PARSE: Provides for breaking a raster into sub-rasters by finding vertical or horizontal strips of white space inside the raster.

MERGE: Provides for replacing a set of raster by a single raster containing an image of the set.

ALIGN: Provides for sliding rasters to form alignments along any of their bounding edges, or centers.

KILL: Provides for deleting a raster and placing it on a kill ring.

YANK: Provides for retrieving a raster from the kill ring and placing it at a specified destination location.

The above list of operations is meant to be exemplary and not exhaustive. It would be apparent to one of skilled in the art to include other operations for a set interpretation without departing from the spirit and scope of the present invention.

Figure 3:
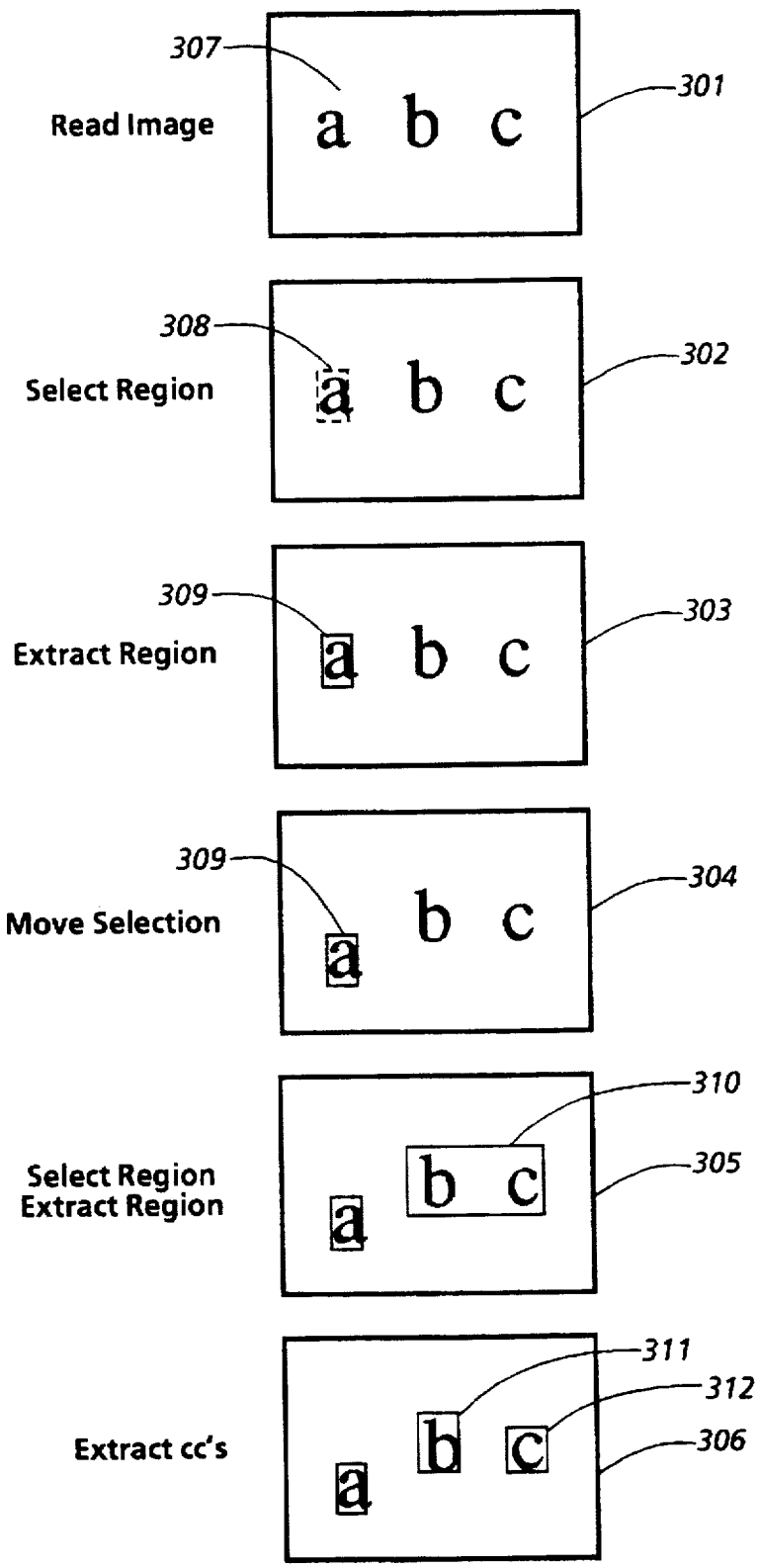
FIG. 3 illustrates a sequence of set operations being performed on a scanned document image as may be performed in the currently preferred embodiment of the present invention.

FIG. 3 is an example illustrating operations performed in a set interpretation. Referring to FIG. 3, in panel 301 a document image is read having an underlying raster 307 associated with it. Initially the raster 307 will contain the letters "a b c". In panel 302, a select region operation is performed wherein the character "a" 308 is selected. In the currently preferred embodiment such selection is performed by defining a bounding box surrounding the character. Here the bounding box is illustrated by the dashed lines. The bounding box is created by using a technique well known in the art of graphical user interfaces of selecting a point with a mouse and dragging the cursor wherein the bounding rectangle is defined. In panel 303, the selected region is extracted to create a raster 309 which contains the letter "a" via an extract operation. At this point, raster 307 contains only the letters "b" and "c" as the letter "a" has been extracted. In panel 304, the selected region containing raster 309 is spatially moved to a new location via a move operation. In panel 305, select and extract operations are performed on the characters "b c" to created a new raster 310. So at this point, the raster 307 is now empty. Finally, in panel 306 a character parse operation is performed on the raster 310. The character parse operation utilizes a connected characters technique to separate characters in the raster. In any event, the result of performing the character parse operation is the creation of rasters 311 and 312, which contain the characters "b" and "c", respectively. At this point, four (4) different rasters have been created, namely raster 309 having the letter "a", raster 311 having the letter "b", raster 312 having the letter "c" and raster 307 which has no characters.

Sequence Interpretations

Sequence interpretations were motivated by the desire to capture, in a general way, the spatial positioning of characters, lines and columns of text. By nesting sequences, most of the common typographic alignments can be constructed: a page is a sequence of columns, a column is a sequence of lines, a line is a sequence of characters or words.

The sequence interpretation is an extension of the set interpretation, and is intended to support the notion of a collection of ordered, aligned objects. Ordering means that at any time, there is a first object and a last object, and each object (except the last) has a next object, and each object (except the first) has a previous object. The ordering of objects will typically follow a reading order (for example, top to bottom and left to right). The ordering of objects is specified by the sequence interpretation. A user implicitly selects the manner in which objects are ordered through their choice of a particular sequence interpretation.

Figure 4:
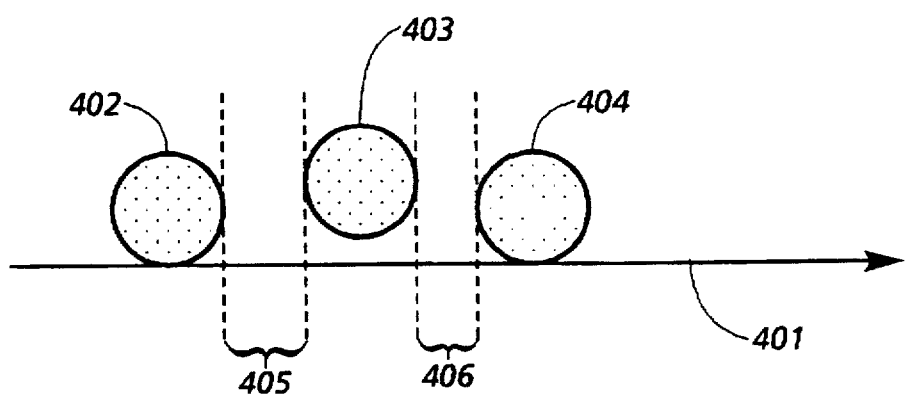
FIG. 4 illustrates the concept of a sequence interpretation as utilized in the present invention.

Alignment means that when some of the objects move, some spacing relationships are preserved. Alignments are measured with respect to a baseline that is stored inside the interpretation. The distance of each object, taken orthogonally from the baseline, is preserved when the objects are moved, i.e. objects slide along the baseline. The interobject distance, measured parallel to the baseline, is also preserved during a move. (Objects maintain the relative spacing to their immediate neighbors.) An illustration of the spacing and alignment appears in FIG. 4. Referring to FIG. 4, graphical objects 402–404 are spatially aligned and ordered along a baseline 401. The graphical objects 402–404 may represent letters in a word or words in a sentence. Further illustrated are interobject spacings 405 and 406, which define the spaces between graphical objects 402 and 403 and between graphical objects 403 and 404, respectively. For many interpretations, insertion and deletion operations preserve the interobject spacing and the distance of the graphical objects to the baseline. More generally, the interpretation could enforce some constraint on objects with respect to the baseline, such as maintaining fixed-pitch spacing, a tabular layout of cells, or adjusting interobject spacing to achieve justification to a given column width.

Various significant variants of the basic sequence interpretation are defined. The class linear-interpretation adds in the notion of a baseline, so that objects are ordered by their positions in the plane, with respect to some baseline. Baselines are, essentially, local coordinate systems used to compute "along"(parallel) and "above"(orthogonal) displacements of the elements. The class text interpretation is used to hold those aspects of the computation that are text specific, in particular, the calculation of a baseline given elements that may have descenders, and the grouping together of neighboring elements that overlap enough to be considered part of the same character In the currently preferred embodiment, there are several operations for creating instances of linear interpretations, each providing a different hint used in computing the baseline. The operation "create horizontal interp" builds the selected graphical objects into a new interpretation whose baseline is forced to be horizontal, e.g. it is tangent to the lowest bottom edge of all the objects in the interpretation. The operation "create vertical interp", by analogy, forces the baseline to lie parallel to the y-axis. The more general operation, "create rotated interp", computes a best-fit baseline that passes near the "edge" of each object.

The best-fit baseline for a linear interpretation of a set of objects is computed using the following technique. First, a line is fit through all the lower-left corners of the bounding boxes of each object. The bounding boxes are aligned with the original image coordinate systems. This is a fair approximation to the baseline, but neglects the protrusion of the corner out from the occupied area of the bounding box, an effect which is magnified in severe rotations. In the next stage, the bounding boxes are recomputed so that their edges are parallel or orthogonal to the approximate baseline; a new line is then fit through their lower-left corners. This line is the final estimate of the baseline.

Figure 5:
FIG. 5 illustrates the concept of a baseline calculation as utilized in the present invention.

The class text-interpretation is a specialization of linear-interpretation. It adds support for descenders in the baseline computation, and for grouping together objects that overlap along the baseline, under the assumption that they are separate pieces of the same character. The techniques for supporting characters having descenders in a baseline computation is illustrated in FIG. 5. Referring to FIG. 5, a baseline is computed based on a line fit of the lower left hand corner point of the bounding boxes defining each object. This is illustrated by the baseline 502 for the character objects defining the word "pancakes" as illustrated by 501. The median of the distances of the corner point to this baseline is calculated. The bounding boxes having corners exceeding the median are eliminated from the computation and a new line fit is generated. The process is repeated a second time. The final baseline is illustrated with the character objects 503 as baseline 504.

Figure 6:
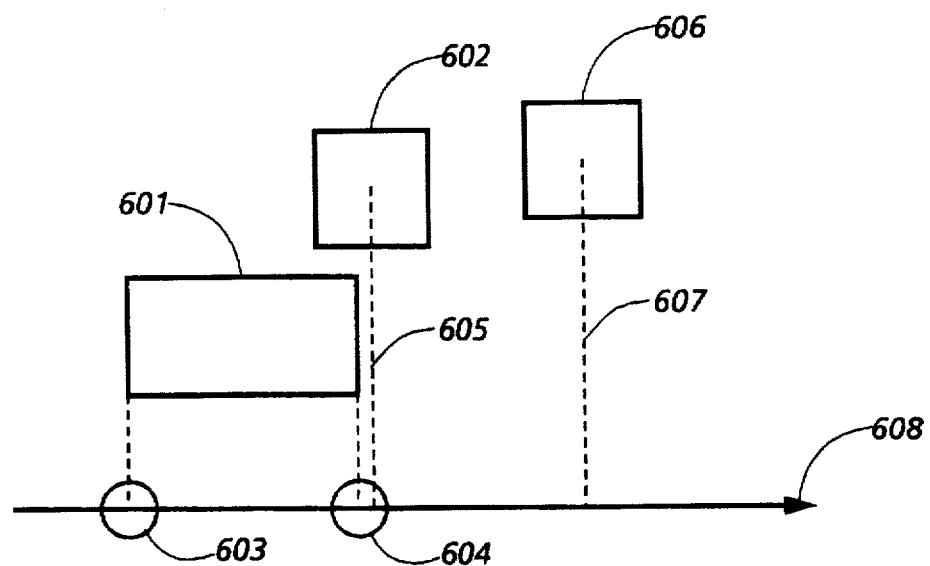
FIG. 6 illustrates grouping of overlapping graphical objects as may be performed in a text interpretation operation in the currently preferred embodiment of the present invention.

FIG. 6 illustrates the grouping of overlaying character pieces that may be considered part of the same character. This may happen for example with the character "i". The class text-interpretation contains an operation which would allow grouping of objects if the projection of the center of one object's bounding box onto the baseline lies within the projection of the bounding box of another object, within some allowed predetermined distance. Referring to FIG. 6, bounding boxes 601–603 are projected onto baseline 608. A centerline 605 of bounding box 602 lies within the predetermined distance 604. Note predetermined distance 603 also lies on the opposite side of the bounding box, so that the projection may be on either side of bounding box 601. Thus, the bounding box 601 and 602 could be grouped as a single character. Note that centerline 607 of bounding box 606 does not lie within any other bounding box, so it cannot be combined with any other object.

The primary operations supplied by linear interpretations is cursor movement and editing. A cursor is located between two elements of the sequence (or before the first element or after the last element). The cursor can be moved forward or backward through the sequence. This may be indicated visually on a screen as a caret drawn between the objects, at the baseline. The editing operations are insert, delete, or composites of the two. Insertion and deletion take place at the cursor. Insertion inserts some graphical object (specified via the mouse or taken from kill ring) before the character that follows the cursor. Deletion removes the character after the cursor. Insert adds a new element to the sequence, making room by sliding over the remaining elements of the sequence by the amount necessary to make just enough room for the new element. Delete does the converse, removing the element, and shifting the remaining elements to close up the gap.

Figure 7:
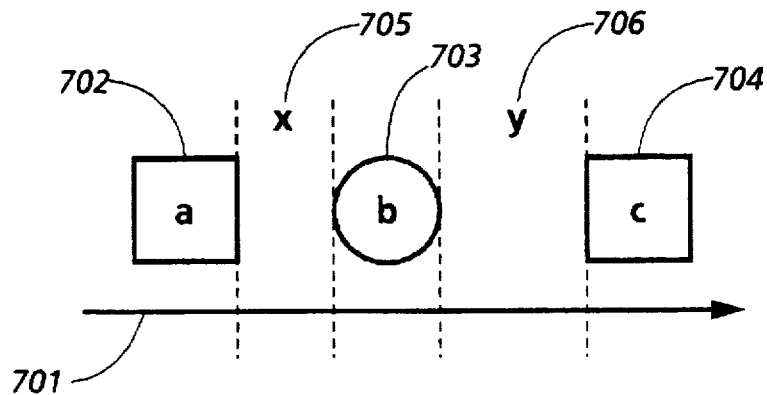
FIG. 7 illustrates calculation of spacing for deletion of a graphical object in a text interpretation operation as may be performed in the currently preferred embodiment of the present invention.
Figure 8:
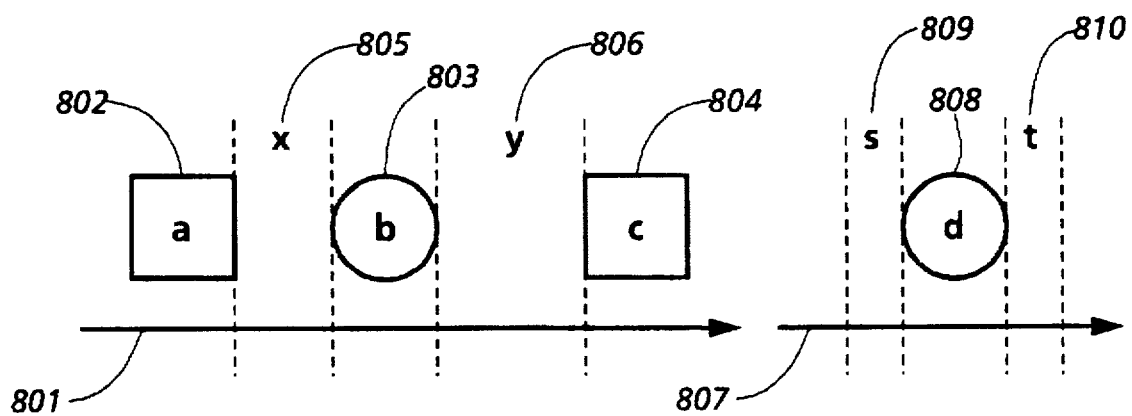
FIG. 8 illustrates illustrates calculation of spacing for insertion of a graphical object in a text interpretation as may be performed in the currently preferred embodiment of the present invention.

The spacing in the neighborhood of the insertion or deletion is detailed in FIGS. 7 and 8. FIG. 7 illustrates the spacing for deletion of an object. In the currently preferred embodiment, when an object is deleted, it is necessary to adjust the spacing between the original objects to accommodate this change. There are various possibilities but a consistent approach must be taken. Referring to FIG. 7, objects a 702 and b 703 are separated by distance X 705 and objects b 703 and c 704 are separated by distance Y 706. If for example, the object b 703 is to be deleted then either distance X 705 or distance Y 706 could be chosen as the new distance between objects a 702 and c 704. In the currently preferred embodiment, the distance X 705 would be used. However, it would be apparent to one skilled in the art to use the distance Y 706 or any other desirable distance, so long as the chosen distance is consistent. Of course the actual placement of the objects depends on whether text being interpreted is characterized as left, right or middle justified, and the foregoing only applies to the interobject spacings.

FIG. 8 illustrates the spacing for insertion of an object. Referring to FIG. 8, objects a 802, b 803 and c 804 lie along baseline 801. The objects a 802 and b 803 are separated by distance X 805 and objects b 803 and c 804 are separated by distance Y 806. Object d 808 on baseline 807 is to be inserted before object b 803. Object d 808 has associated with it before space s 809 and after space t 810. Accordingly, the candidates for the spacing to be used before object d 808 are distances X 805 and s 809, and the candidates for the spacing to be used after object d 808 are Y 806 and t 810. When the object d 808 is inserted, in the currently preferred embodiment the distance X 805 is used as the space before object d 808 and t 810 for the space after. In the event that there is nothing following d 808 (i.e. there is no t 810), the distance Y 806 is used.

There are several other operations that apply to linear interpretations. The first reverses the order in which the elements are accessed (by inverting the next/previous relation). It does not change their geometric locations. Thus, if the reading order is originally left-to-right, the elements will subsequently be read right-to-left. The second operation affects which elements are moved by an insertion or deletion operation. In ordinary printed English text, the characters are left-justified, so that the position of the first element on the line remains fixed, while the later characters float to accommodate new characters or close gaps. Thus, the first element is "pinned". The pinned element can be changed to be the last element of the sequence, so that the preceding elements will move. Note that this parameter is separate from the reading order of the elements. In general, any element, or geometric position, could be the pinning point. A third degree of flexibility comes in changing the placement of the baseline. Given a sequence of elements in the plane, it is impossible to determine, without actually trying to read the elements as characters, whether their baseline lies below them or above them (if they were printed upside down, and right-to-left). Therefore, it is necessary to have an operation that moves the baseline to the "other side" of the line.

Because interpretations can contain objects that are themselves interpretations, there are commands for traversing this tree structure. The ordinary movement commands (forward/backward) apply to the selected interpretation. The selected interpretation can be switched (via select-up-interp) to the containing interpretation of the currently selected interpretation (assuming there is one). If the object after the cursor is an interpretation, then it can be chosen as the selected interpretation (using select-down-interp).

Editing Examples

What follows are several editing examples (i.e. instances of interpretations) which illustrate the flexibility and robustness of editing functions that may be performed in the present invention.

Rotated Baseline

Figures 9, 10:
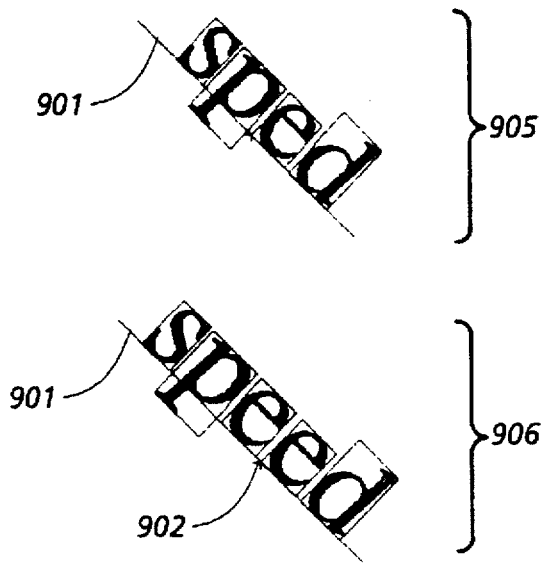
FIG. 9 illustrates an editing example for editing text along a rotated baseline as may be performed in the currently preferred embodiment of the present invention.
FIG. 10 illustrates an editing example for editing text with interwoven languages as may be performed in the currently preferred embodiment of the present invention.

FIG. 9 illustrates an instance of a text interpretation where the baseline is rotated off the horizontal. The editing operation to be performed will be the insertion of a new character. Referring to FIG. 9, in the before image 905, the word "sped" lies on baseline 901. Baseline 901 is rotated significantly off the horizontal. The instance of a text interpretation for this example is created by selecting text interpretation for text with a rotated baseline and then selecting the area of the document image containing the word "sped". This selected area may then be character parsed to create rasters for the individual letters. The baseline is then calculated in the manner described above.

In the after image 906, the letter "e" 902 has been inserted before the letter "d" to create the word "speed". Note that the other characters have been slid along baseline 901 to accommodate the inserted character.

It should be noted that in the currently preferred embodiment, the bounding boxes around each of the characters would not be displayed. They are shown in FIG. 9 to emphasis the alignment and spacing of the character rasters.

Text with Interwoven Languages

The ability to build interpretations based on a specified order and position of text is illustrated in FIG. 10. FIG. 10 is a passage in non-English language with an English translation. The non-English text is on lines 1001, 1003, 1005 and 1007 while the English translation is interwoven on a line by line basis as shown on lines 1002, 1004 and 1006. Clearly, to read the English translation, the reading order of the text is to skip every other line. This could have an effect on how the text is to adjusted when editing operations are performed. For example, if an error in the translation occurs, editing would only effect lines 1002, 1004 and 1006, so that for any insertions or deletion of characters or words it may be desirable to have the changes wrap along the succeeding or preceding lines. The present invention allows the user to specify how areas of text are linked (e.g. by selection and ordering of the areas containing the text.) In this example it would be accomplished by an operation wherein a user selects and orders the lines 1002, 1004 and 1006 in an operation of a text interpretation. Any insertion or deletion of characters would then result in word wrapping along only lines 1002, 1004 and 1006.

Text On A Non-Linear Baseline

Figure 11:
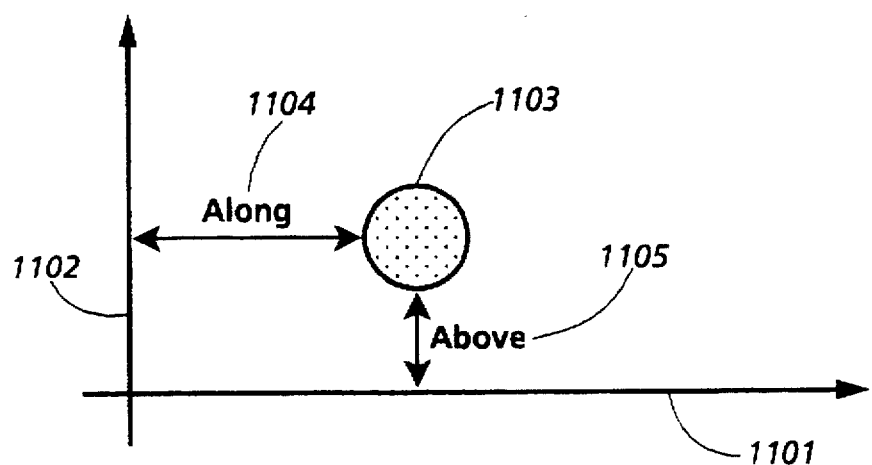
FIG. 11 illustrates how the position of a graphical object is determined with respect to a baseline in the currently preferred embodiment of the present invention.

Editing text having a non-linear baseline, such as circular arc, is readily accomplished with the present invention. This is because an object's position is represented as a translation along a baseline and a displacement above it. This positioning is illustrated in FIG. 11. Referring to FIG. 11, object 1103 is above baseline 1101 by an above distance 1105 and is translated along baseline 1101 by an along distance 1104. Further illustrated in FIG. 11 is coordinate axis 1102 which provides a reference for the origin of the graphical object's coordinate system. Note that while the object 1103 herein is circular, the graphical object would typically have a bounding box, so the above and along distances will be simple calculations.

Figure 12:
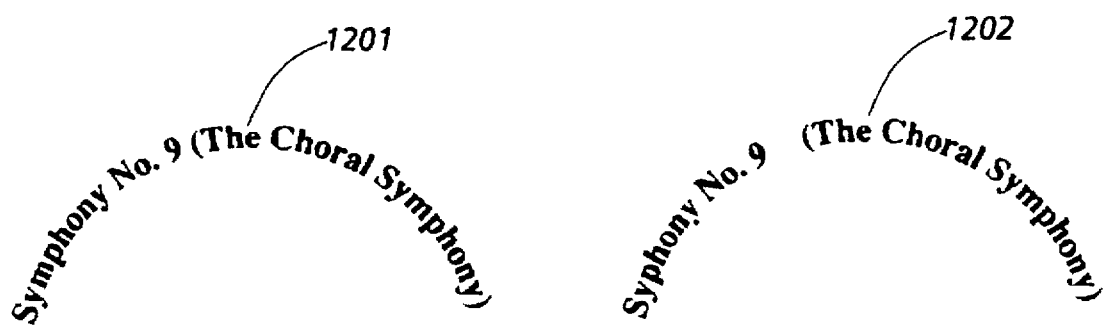
FIG. 12 illustrates an editing example for editing text on a non-linear baseline as may be performed in the currently preferred embodiment of the present invention.

FIG. 12 illustrates editing along a circular baseline. Before image is illustrated at 1201. The "after image" is illustrated at 1202. A circular text interpretation is constructed to handle this editing wherein as an object slides along the arc to accommodate an insertion or deletion, it is rotated to keep its internal coordinate system in the same relative orientation to the closest point on the baseline. Note that in calculating the baseline a curve fit technique is used rather than a line fit. Referring back to FIG. 12, the letter "m" in the word "Symphony" has been deleted. Note that the circular interpretation need not include the entire text. Only enough characters to create a circular baseline need be selected for the interpretation. Here only the first 12 characters were selected (i.e. "Symphony No. 9"). Thus, an image editing system based on simple interpretations is disclosed.

What is claimed is:

1. A method for editing a bit-mapped representation of an image comprising the steps of:
   a) providing a plurality of interpretations for editing sets of graphical objects, each of said plurality of interpretations for editing a set of graphical objects according to a desired characteristic so that the results of editing said set of graphical objects are in accordance with said desired characteristic, each of said plurality of interpretations comprised of one or more editing operations;
   b) receiving a bit-mapped representation of an image;
   c) a user selecting one of said plurality of interpretations;
   d) said user selecting a set of graphical objects from said bit-mapped representation of an image;
   e) said user selecting an editing operation for the selected interpretation; and
   f) responsive to said user selecting said editing operation, processing said graphical objects in the manner defined by said editing operation so that it is in accordance with said desired characteristic.

2. The method as recited in claim 1 wherein a graphical object includes a raster representation of a selected portion of said bit-mapped representation of an image.

3. The method as recited in claim 2 wherein a graphical object includes the result of an editing operation performed on an instance of an interpretation of a set of graphical objects.

4. The method as recited in claim 1 wherein said plurality of interpretations includes a set interpretation, in which graphical objects maintain spatial relationships and a sequence interpretation in which graphical objects maintain ordered spatial relationships.

5. The method as recited in claim 1 wherein said plurality of interpretations further includes a text interpretation for treating graphical objects in a text-like fashion.

6. The method as recited in claim 5 wherein said text interpretation is selected and said step of processing said graphical objects in the manner defined by said editing operation is further comprised of the step of determining a baseline for said graphical objects.

7. The method as recited in claim 6 wherein each of said graphical objects is spatially defined by a bounding box, each bounding box defining a lowest left corner point, and said step of determining a baseline for said graphical objects is further comprised of the steps of:

a) finding an initial baseline based on the lowest left corner point of each bounding box;

b) finding an initial median distance from said initial baseline and said lower left corner point of each bounding box;

c) removing bounding boxes whose lowest left corner point distance from said initial baseline exceeds said initial median distance resulting in a first set of remaining bounding boxes;

d) finding an intermediate baseline based on the lowest left corner point for said first set of remaining bounding boxes;

e) finding an intermediate median distance from said intermediate baseline based on said first set of remaining bounding boxes; and f) removing bounding boxes from said first set of remaining bounding boxes whose lowest left corner point exceeds said intermediate distance resulting in a second set of remaining bounding boxes; and h) finding said baseline from the lowest left corner points of said second set of remaining bounding boxes.

8. The method as recited in claim 7 wherein said baseline is a horizontal line.

9. The method as recited in claim 7 wherein said baseline is a vertical line.

10. The method as recited in claim 7 wherein said baseline is a line rotated off the horizontal.

11. The method as recited in claim 7 wherein said baseline is an arc.

12. A system for editing text in a bit-mapped image comprising:

means for capturing a bit-mapped image;

a display for displaying said bit-mapped image;

a user interface for selecting graphical objects from said bit-mapped image;

a set interpretation of graphical objects, said set interpretation for editing graphical objects as an unordered list of graphical objects, said set interpretation having a first set of editing operations, wherein execution of any of said first set of editing operations will result in said unordered list of graphical objects maintaining their original spatial relationships;

a sequence interpretation of graphical objects, said sequence interpretation for editing graphical objects as an ordered list of graphical objects, said sequence interpretation having a second set of editing operations, wherein execution of any of said second set of editing operations will result in said ordered list of graphical objects to re-position graphical objects in order to maintain a predetermined characteristic spatial relationship.

13. The system as recited in claim 12 wherein said predetermined characteristic is text and said sequence interpretation includes an insert edit operation and a delete edit operation.

14. The system as recited in claim 13 wherein said sequence interpretation is further comprised of a baseline determination means for determining a baseline for a set of graphical objects.

15. The system as recited in claim 14 wherein said sequence interpretation is further comprised of means for identifying distances between graphical objects and means for maintaining distances between graphical objects upon insertion or deletion operations being performed.

16. A system for editing text contained in a scanned document image comprising:

a display for displaying said scanned document image;

a set interpretation of graphical objects, said set interpretation comprising a plurality of set interpretation edit operations for editing a set of graphical objects as a fixed raster image of said set of graphical objects;

a text interpretation of graphical objects, said text interpretation comprising:
means for extracting from a graphical object a plurality of graphical objects representing characters;
means for calculating a baseline for said graphical objects representing characters;
a plurality of text interpretation edit operations for editing said graphical objects as text with respect to said baseline;

a user interface comprising:
means for selecting graphical objects from said scanned document image displayed on said display;
means for creating a graphical object from an edit operation from an instance of said set interpretation; and
means for creating a graphical object from an edit operation from an instance of said text interpretation.

17. The system for editing text contained in a scanned document image as recited in claim 16, wherein a graphical object is spatially identified by a bounding box surrounding said graphical object.

18. The system for editing text contained in a scanned document image as recited in claim 17, wherein said means for calculating a baseline for said graphical objects representing characters is further comprised of:

means for determining performing a line fit between a predetermined corner point of a set of bounding boxes to create an intermediate baseline; and means for identifying bounding boxes having said predetermined corner point being a distance from said intermediate baseline which exceeds a predetermined threshold.

19. The system for editing text contained in a scanned document image as recited in claim 17, wherein said means for calculating a baseline for said graphical objects representing characters is further comprised of:

means for determining performing a curve fit between a predetermined corner point of a set of bounding boxes to create an intermediate baseline; and means for identifying bounding boxes having said predetermined corner point being a distance from said intermediate baseline which exceeds a predetermined threshold.

20. The system for editing text contained in a scanned document image as recited in claim 16, wherein said text interpretation further comprises a means for determining graphical object spacings.

21. The system for editing text contained in a scanned document image as recited in claim 20, wherein each of said plurality of text interpretation edit operations further comprises means for maintaining graphical object spacings.

22. A method for editing text contained in a scanned document image comprising the steps of:

a) selecting a first graphical object from said scanned document image and adding to an ordered list of graphical objects, said first graphical object representing a first line of text;

b) selecting a second graphical object from said scanned document image and
adding to said ordered list of graphical objects, said second graphical object representing a second line of text;

c) parsing said first graphical object into a first plurality of graphical objects each representing characters in said first line of text;

d) removing said first graphical object from said ordered list and replacing with said first plurality of graphical objects representing characters in said first line of text;

e) parsing said second graphical object into a second plurality of graphical objects each representing characters in said second line of text;

f) removing said second graphical object from said ordered list and replacing with said second plurality of graphical objects representing characters in said second line of text; and g) inserting one or more graphical objects representing characters into said first line of text resulting in the following steps being performed:

g1) inserting said one or more graphical objects representing characters into said ordered list at a point corresponding to their insertion point;

g2) shifting graphical objects representing characters in said first line of text;

g3) determining if any graphical objects should be moved to said second line of text because of the number of inserted graphical objects; and g4) if graphical objects should be moved to said second line of text, identifying a logical grouping of graphical objects from said graphical objects in said first line of text and move them to said second line of text.

23. The method as recited in claim 22 wherein said logical grouping is a word.

* * * * *